(12) United States Patent
Nefti et al.

(10) Patent No.: US 7,457,748 B2
(45) Date of Patent: Nov. 25, 2008

(54) METHOD OF AUTOMATIC PROCESSING OF A SPEECH SIGNAL

(75) Inventors: Samir Nefti, Lannion (FR); Olivier Boeffard, Pleumeur Bodou (FR)

(73) Assignee: France Telecom, Paris (FR)

( * ) Notice: Subject to any disclaimer, the term of this patent is extended or adjusted under 35 U.S.C. 154(b) by 834 days.

(21) Appl. No.: 10/638,428

(22) Filed: Aug. 12, 2003

(65) Prior Publication Data

US 2004/0083102 A1    Apr. 29, 2004

(30) Foreign Application Priority Data

Oct. 25, 2002   (FR)   .................................. 02 13417

(51) Int. Cl.
*G10L 15/08* (2006.01)
(52) U.S. Cl. ..................... 704/240; 704/258; 704/260
(58) Field of Classification Search ................. 704/200, 704/236, 240, 243, 250, 255, 256, 260, 266, 704/257, 270, 272, 258
See application file for complete search history.

(56) References Cited

U.S. PATENT DOCUMENTS 6,366,883 B1 *  4/2002  Campbell et al. ........... 704/260
7,206,741 B2 *  4/2007  Deng et al. ................. 704/254

OTHER PUBLICATIONS

M. Giustiniani et al., "Phonetic Ergodic HMM for Speech Synthesis," Enstitute of Electrical Engineers, Stevenage, GB, 1991, (pp. 349-352), Abstract.

* cited by examiner

*Primary Examiner*—Huyen X. Vo
(74) *Attorney, Agent, or Firm*—Young & Thompson

(57) ABSTRACT

Method of automatically processing a speech signal which comprises the steps of:
  determining a sequence of probability models corresponding to a given text;
  determining a sequence of acoustic strings corresponding to the diction of the given text;
  aligning between the sequence of acoustic strings and the sequence of models; and
  determining a confidence index of acoustic alignment for each association between a model and an acoustic segment.

Each determining step of an alignment confidence index is carried out at least from a combination of the model probability, a priori model probabilities and the average duration of occupancy of the models.

21 Claims, 3 Drawing Sheets

Determination of a Sequence of Probability Models to Represent a Given Text

Determination of a Sequence of Projected Data Strings

Association Between Strings and Models

Calculation of a Confidence Index for Each Association

Manual Correction

METHOD OF AUTOMATIC PROCESSING OF A SPEECH SIGNAL

TECHNICAL FIELD

The present invention relates to a method of automatic processing of a speech signal including a step of alignment between a model of a text and a speech signal corresponding to the diction of this text.

Such methods are used, for example, within the framework of speech synthesis or also the determination of learning databases for voice recognition systems.

BACKGROUND TO THE INVENTION

With reference to FIG. 1, a method of automatic processing according to the prior art will be described within the framework of voice synthesis.

This method includes an automatic step 2 of determination of a sequence of probability models which represent a given text.

Conventionally, the probability models used are a finite number of so-called hidden Markov models or HMM which describe the probability of acoustic production of symbolic units of a phonological nature.

At the same time as step 2, the method includes a step 4 of determination of a sequence of digital data strings corresponding to the diction of the same given text, or acoustic strings.

The method then includes a step 6 of alignment between the sequence of acoustic strings and the sequence of models.

Thus each symbolic unit of phonological order represented by one or several models has associated with it a sub-sequence of acoustic strings known as an "acoustic segment".

For example, these associations between a symbolic unit and an acoustic segment are memorised individually in order to permit subsequent speech synthesis by generating a sequence of acoustic strings corresponding to a text other than the aforementioned given text.

However, variations may appear at the time of the alignment step 6 resulting in particular from differences between the speech signal as really pronounced and the sequence of models corresponding to a theoretical pronunciation.

In fact, step 2 of determination of a sequence of models associates a single model sequence with a given text.

However, the diction of this text may give rise to different speech signals due to the influence of the speaker. In particular, phonetic units or phonemes may be associated with each other as in the case of liaisons, or also other phonemes may be omitted or lengthened.

Such variations may involve the association of a model with an erroneous and/or displaced acoustic segment, thus introducing an error of alignment into the following acoustic segments.

The result of these variations is the necessity of introducing, for each association between an acoustic segment and one or several models, a confidence index during step 8 which enables a probability score to be attributed to each association.

However, in the methods according to the prior art, these confidence indices calculated for each model are not very precise.

In particular, these confidence indices are calculated essentially from the probabilities of transition from one model to the other. Thus these confidence indices are directly calculated for a segment of acoustic strings involving a low degree of precision.

Conventionally, these confidence indices only permit the rejection of certain associations which are corrected manually by specialists during a long and costly correction step 10.

It is therefore apparent that in the methods according to the prior art the precision of the confidence indices is insufficient, thus making the processing methods long and costly due to the necessity of human interventions for corrections.

The object of the present invention is to remedy this problem by defining an automatic method of processing which includes a confidence index with increased precision.

SUMMARY OF THE INVENTION

The invention relates to a method of automatic processing of a speech signal comprising:

an automatic step of determination of at least one sequence of probability models coming from a finite directory of models, each sequence describing the probability of acoustic production of a sequence of symbolic units of a phonological nature coming from a finite alphabet, the said sequence of symbolic units corresponding to at least one given text and the said probability models each including an observable random process corresponding to the acoustic production of symbolic units and a non-observable random process having known probability properties, so-called Markov properties;

a step of determination of a sequence of digital data strings, known as acoustic strings, representing acoustic properties of a speech signal;

a step of alignment between the said sequence of acoustic strings and the said sequence of models, each model being associated with a sub-sequence of acoustic strings, forming an acoustic segment, and each value of the non-observable process of each model being associated with a sub-sequence of acoustic strings forming an acoustic sub-segment in order to deliver a sequence of non-observable process values associating a value with each acoustic string, known as an aligned sequence; and a step of determination of a confidence index of acoustic alignment for each association between a model and an acoustic segment, known as a model alignment confidence index, and corresponding to an estimate of the probability a posteriori of the model given the observation of the corresponding acoustic segment, known as the a posteriori model probability.

Each step of determination of an alignment confidence index for a model comprises the calculation of the value of the said index at least from a combination of:

the probability of observation of each acoustic string given the value of the non-observable process, known as the model probability and determined from known mathematical properties of the model and of the said sequence of acoustic strings;

probabilities of production a priori of all the models of the said directory, independently of one another, known as the a priori model probabilities; and the analytical estimation of the average duration of occupancy of the values of the non-observable process of the model.

According to other characteristics:

each step of determination of an acoustic confidence index for a model includes a sub-step of determination of the estimate of the a priori probability of each value of the non-observable process of the model, known as the a priori value probability, carried out on the basis of the said analytical estimation of the average duration of occupancy of the values of the non-observable process of the model;

each step of determination of an alignment confidence index for a model includes a sub-step of determination of a confidence index for each acoustic string forming the acoustic segment associated with the said model and a sub-step of combination of the confidence indices of each string of the said segment in order to deliver the said confidence index of the said model;

each sub-step of determination of a confidence index for a given string includes:

a sub-step of initial calculation combining the model probability, the a priori model probability of the model in progress and the average duration of occupancy of the non-observable values for all the values of the non-observable process of the said aligned sequence and of the model in progress;

a sub-step of calculation of the product of the model probability, the a priori model probability and the a priori value probability, carried out for each value of the non-observable process of all the possible models in the said finite directory of models; and a sub-step of summation of all the said products for all the possible models of the said finite directory of models in order to deliver the said confidence index of the said given acoustic string from the results of the said sub-steps;

the said automatic step of determination of a sequence of probability models corresponding to a given text includes:

a sub-step of acquisition of a graphemic representation of the said given text;

a sub-step of determination of a sequence of symbolic units coming from a finite symbolic alphabet from the said graphemic representation; and an automatic sub-step of modelling of the said sequence of units by its breakdown on a base of the said probability models in order to deliver the said sequence of probability models;

the said modelling sub-step associates a single probability model with each symbolic unit of the said sequence of symbolic units;

the said step of determination of a sequence of digital strings includes:

a sub-step of acquisition of a speech signal corresponding to the diction of the said given text, adapted in order to deliver a sequence of digital samples of the said speech signal; and a sub-step of spectral analysis of the said samples in order to deliver a breakdown of the frequency spectrum of the said speech signal on a non-linear scale, the said breakdown forming the said sequence of acoustic strings;

the said sub-step of spectral analysis corresponds to a sub-step of Fourier transformation of the said speech signal, of determination of the distribution of its energy on a non-linear scale by filtering, and of transformation into cosine;

the said step of alignment between the said sequence of acoustic strings and the said sequence of models includes:

a sub-step of calculation of a plurality of possible alignments each associated with a relevance index; and a sub-step of selection of a single alignment amongst the said plurality of possible alignments;

the said sub-step of determination of a plurality of possible alignments comprises the calculation of at least one optimum alignment, as determined by a so-called Viterbi algorithm;

it also includes a step of local modification of the said sequence of models as a function of the said alignment confidence indices determined for each model of the said sequence of models;

the said step of local modification comprises a sub-step of deletion of a model from the said sequence of models;

the said step of local modification includes a sub-step of substitution of a model of the said sequence of models by another model;

the said step of local modification includes a sub-step of insertion of a model between two models of the said sequence of models;

the said steps of alignment and of calculation of a confidence index are repeated after each step of local modification of the said sequence of models;

the said step of determination of at least one sequence of models is adapted for the determination of a sequence of models corresponding to a given text, and in that the said sequence of acoustic strings represents properties of a speech signal corresponding to the locution of the said same given text;

the said step of determination of sequences of models is adapted for the determination of a plurality of sequences of models each corresponding to a given text, and in that the said sequence of acoustic strings represents properties of a speech signal corresponding to the locution of any text whatsoever, the said method including a step of selection of one or several sequences of models amongst the said plurality for carrying out the said step of determination of confidence indices;

the said models are models of which the observable processes have discrete values, the values of the non-observable processes being the states of these processes;

the said models are models of which the non-observable processes have continuous values.

BRIEF DESCRIPTION OF DRAWINGS

The invention will be better understood upon reading the following description which is given solely by way of example and with reference to the accompanying drawings, in which, apart from FIG. 1 which has already been mentioned and shows a flow chart of a method of automatic processing according to the prior art within the framework of voice synthesis.

DESCRIPTION OF PREFERRED EMBODIMENT

Figure 1:
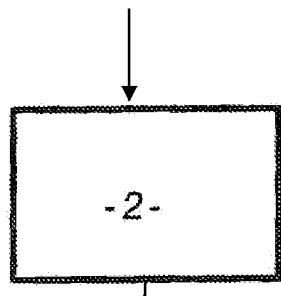
Figure 1:
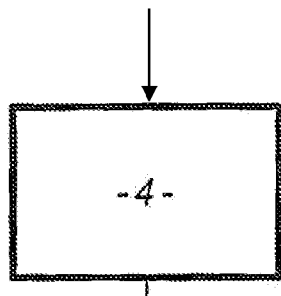
Figure 1:
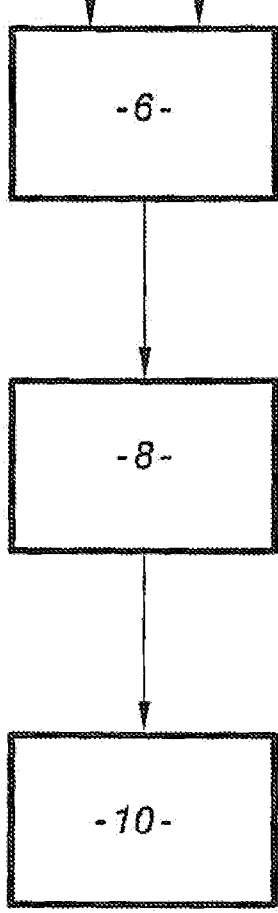
Figure 2:
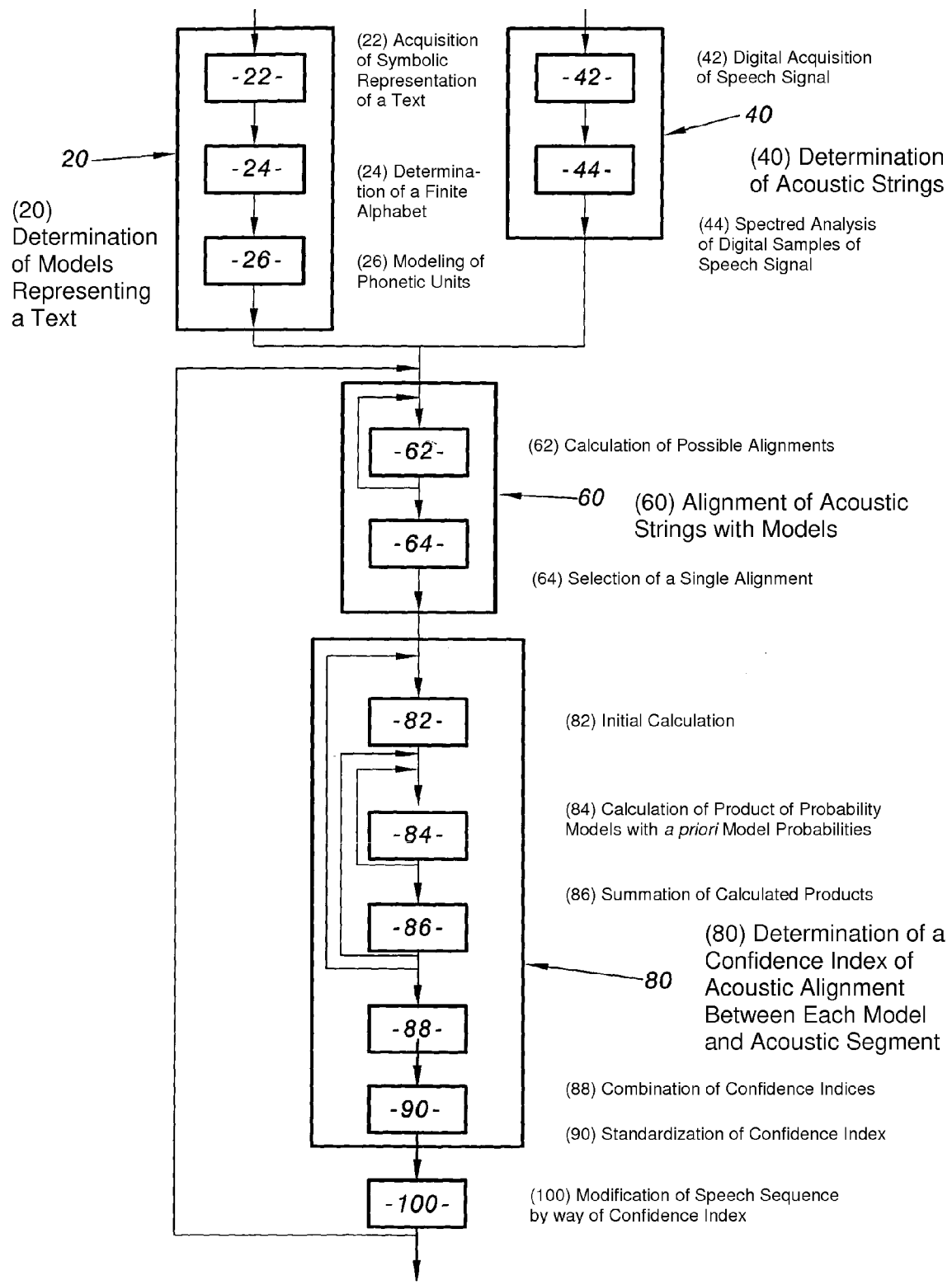
FIG. 2 shows a flow chart of a method of processing according to the invention within the framework of voice synthesis.

The method according to the invention described in FIG. 2 includes a step 20 of automatic determination of a sequence of probability models representing a given text.

In the described embodiment, this step 20 includes a sub-step 22 of acquisition of a symbolic representation of a given text, such as a graphemic or orthographic representation.

Figure 3:
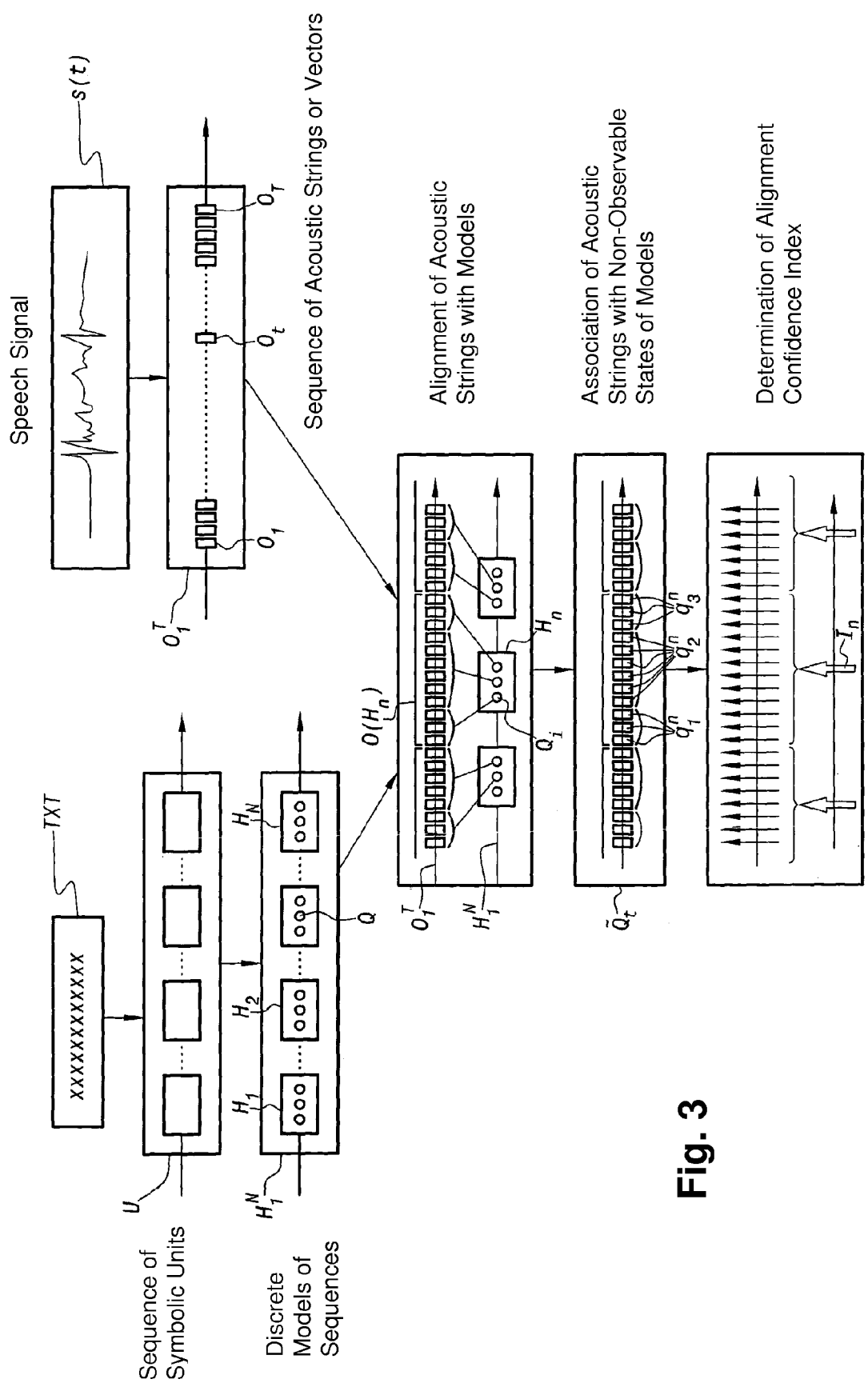
FIG. 3 shows the detail of specific signals in the course of the method described with reference to FIG. 2.

For example, this graphemic representation is a text drawn up with the aid of the Roman alphabet, designated by the reference TXT in FIG. 3.

The method then includes a sub-step 24 of determination of a sequence of symbolic units of a phonological nature of a finite alphabet from the said graphemic representation.

Such a sequence of symbolic units, denoted by the reference U in FIG. 3, is for example composed of phonemes extracted from a phonetic alphabet.

This sub-step 24 is carried out automatically by means of conventional techniques in the prior art, such as phoneticisation or other such techniques.

Thus for example the text "monsieur" in the French language is represented at the end of sub-step 24 by the sequence of phonetic units: [m]-[□]-[s]-[j]-[ø].

In particular this sub-step 24 implements a system of automatic phoneticisation using databases and permitting the breakdown of any text whatsoever on a finite symbolic alphabet.

The step 20 then includes an automatic sub-step 26 of modelling of the sequence U of phonetic units by its breakdown on a base of probability models of hidden Markov models, commonly known as HMM.

In the described embodiment, the models of the sequence are referenced $H_1$ to $H_N$ in FIG. 3 and are discrete models each including an observable random process corresponding to an acoustic production and a non-observable random process designated Q and having known probability properties called Markov properties, according to which the realisation of the future state of a random process only depends upon the present state of this process.

These models are defined previously, for example with the aid of neural networks which make it possible to determine all of their parameters and in particular probabilities of retention in a given hidden state as well as probabilities of transition between the final hidden state of a model and the initial hidden state of another model.

The known mathematical properties of the Markov models make it possible to determine the probability of observation of an acoustic production designated $O_t$, given the state of the non-observable process Q, known as the model probability, denoted by $P_m$ and corresponding to:

$$P_m = P(O_t | Q_t)$$

It will be recalled that such an expression is a conditional probability and corresponds to the probability of observation of the random variable $O_t$, it being supposed that a given state $Q_t$ of the random process Q has been produced.

These Markov models come from a finite directory including for example 36 difference models referenced $\lambda_1$ to $\lambda_I$ and are associated with the symbolic units of the symbolic alphabet referred to previously.

In the described embodiment, each symbolic unit is associated with a single hidden Markov model, such that the sequence U of phonetic units makes it possible to determine directly a sequence $H_1$ to $H_N$, denoted $H_1^N$, of hidden Markov models describing the probability of acoustic production of the sequence U of symbolic units.

Thus the step 20 permits the automatic determination of a sequence $H_1^N$ of models corresponding to the automatic phoneticisation of a given text.

At the same time as the step 20 of determination of the sequence $H_1^N$ of models, the method includes in a conventional manner a step 40 of determination of a sequence of digital strings, known as acoustic strings, representing acoustic properties of a speech signal corresponding to the diction of the given text TXT.

In the described embodiment, this step 40 includes a sub-step 42 of acquisition of a speech signal, identified by the reference s(t) in FIG. 3 and corresponding to the diction of the given text TXT.

This sub-step 42 permits the acquisition of the temporal form of the speech signal s(t) which is numbered and sampled such that the sub-step 42 delivers a sequence of digital samples of the speech signal s(t).

As has been stated previously, the speech signal s(t) is directly linked to the characteristics of diction of the speaker such that significant variations can appear between different dictions and that a plurality of acoustic signals can be considered as representing the same text TXT.

The step 40 then includes a sub-step 44 of spectral analysis of the digital samples of the speech signal s(t) in order to deliver a breakdown of the frequency spectrum thereof.

In a conventional manner, this spectral analysis is an analysis known as "MFCC" (Mel Frequency Cepstrum Coefficient) which takes account of the non-linear properties of the auditory perception and of a deconvolution between the acoustic wave and the characteristics of timbre.

In the described embodiment, this analysis is carried out on a sliding window of the Hamming type, the result of which forms a sequence, referenced $O_1^T$ in FIG. 3, of acoustic strings or acoustic vectors referenced $O_1$ to $O_T$.

The sub-step 44 of spectral analysis corresponds for example to a Fourier transformation of the speech signal s(t), to a determination of the distribution of its energy on a non-linear scale by filtering, then to a transformation into cosine.

The method then includes a step 60 of alignment between the sequence $O_1^T$ of acoustic strings and the sequence $H_1^N$ of probability models.

In particular, this step 60 of alignment permits the selection of an optimum alignment in the sense of the so-called Viterbi algorithm.

Thus this alignment step 60 includes a sub-step 62 of calculation of a plurality of possible alignments, each associated with a likelihood index and a sub-step 64 of selection of a single alignment amongst the said plurality of possible alignments.

Such alignment techniques are known in the prior art and make it possible to deliver a sequence of labelled acoustic strings such that each model $H_n$ of the sequence of models $H_1^N$ is associated with a sub-sequence $O(H_n)$ of acoustic strings forming an acoustic segment.

Equally, each state of the non-observable process Q of each model $H_n$ is associated with a sub-sequence of acoustic strings forming an acoustic sub-segment as shown with reference to FIG. 3.

Thus a start label and an end label are determined for each acoustic segment $O(H_n)$ of the sequence $O_1^T$ associated with a given model $H_n$ of the sequence $H_1^N$.

This step 60 also makes it possible to deliver a sequence $Q_t$ of non-observable states, called an aligned sequence, associating with each acoustic string $O_t$ a given non-observable state of a given model, denoted $q_j^i$ and corresponding to the $j^{th}$ state of the $i^{th}$ model of the sequence as shown in FIG. 3.

The method then includes a step 80 of determination of a confidence index of acoustic alignment for each association between a model $H_n$ and an acoustic segment $O(H_n)$.

This confidence index is called the model alignment confidence index, denoted $I_n$, and corresponds to an estimate of the a posteriori probability of the model given the observation of the corresponding acoustic segment denoted $P_{mp}$ and corresponding to:

$$P_{mp} = P(H_n | O(H_n))$$

Within the scope of the invention, each step 80 of determination of an alignment confidence index $I_n$ for a model $H_n$ is carried out on the basis of a combination of:

the probability of observation of each acoustic string given the value of the non-observable process of the corresponding model, that is to say the model probability $P_m$ defined previously;

probabilities of producing a priori all the models $\lambda_1$ to $\lambda_I$ of the directory, independently of one another, known as a priori model probabilities and denoted $P(\lambda_i)$; and the average time of staying at each of the states $q_j^i$ of the model $H_n$, denoted $\bar{d}(q_j^i)$, calculated from characteristic parameters of the model $H_n$ and in particular the parameters of transition between the non-observable states.

The probability of models $P_m$ is determined from the known probability properties of the model $H_n$ and the observed sequence of acoustic strings $O_1^T$.

The a priori model probabilities $P(\lambda_i)$ are for example estimated previously by counting the occurrences of phonemes from graphemic and/or phonetic transcriptions.

The average time of staying makes it possible in particular to estimate the a priori probability of each value or state of the non-observable process Q of a model $H_n$, known as the a priori value probability and denoted $P_{vp}$, which is expressed in the form of conditional probabilities by:

$$P_{vp} = P(q_j^i | \lambda_i)$$

and which corresponds to the a priori probability of being in a given non-observable state referenced $q_j$ of a given model $\lambda_i$, denoted $q_j^i$, as was described previously.

The sequences being in relations of temporal order, the probabilities $P_{vp}$ can be expressed in an analytical manner by the ratio between the average time passed on a state $q_j^i$, denoted $\bar{d}(q_j^i)$, and the average occupation time of the model $\lambda_i$, denoted $\bar{d}(\lambda_i)$ and corresponding to the sums of the average times of staying at each of the states of which it is composed.

The following general analytical relation may then be written:

$$P_{vp} \# \frac{\bar{d}(q_j^i)}{\bar{d}(\lambda_i)}$$

As a function of the embodiments, the method of the invention can receive the $P_{vp}$ probabilities directly, for example calculated previously and stored in a memory, or it can receive the estimates $\bar{d}(q_j^i)$ of the average duration of occupation of the non-observable states of the processes of the model and effect the calculation during a sub-step of determination of the a priori value probability $P_{vp}$.

It then appears that the confidence index $I_n$ can be expressed according to the following relation:

$$I_n = \log \left[ \prod_{t=b(n)}^{e(n)} \frac{P(O_t|\tilde{Q}_t) \frac{\bar{d}(\tilde{Q}_t)}{\bar{d}(H_n)} P(H_n)}{\sum_{i=1}^{I} \sum_{j=1}^{J(i)} P(O_t|Q_t = q_j^i) \frac{\bar{d}(q_j^i)}{\bar{d}(\lambda_i)} P(\lambda_i)} \right]$$

In this relation $\tilde{Q}_t$ corresponds to the instant of the aligned sequence delivered at the end of the sub-step 64 and therefore, in the described embodiment, to an optimum sequence of states in the sense of the Viterbi algorithm extending between the instants $t=b(n)$ and $t=e(n)$ corresponding respectively to the start and the end of the sequence of observation $O(H_n)$.

Since the term $\bar{d}(\tilde{Q}_t)$ corresponds to the average duration of the state at the instant t of the aligned sequence and the term $\bar{d}(H_n)$ corresponds to the average duration of the $n^{th}$ model of the sequence $H_1^N$, they are both obtained from the average duration of occupation of the non-observable states denoted $\bar{d}(q_j^i)$ in a general manner.

Finally, the index i makes it possible to run through the models $\lambda_1$ to $\lambda_I$ of the directory of models and the index j makes it possible to run through the non-observable states 1 to J(i) of each model.

In order to implement this relation, the step 80 includes a sub-step 82 of initial calculation in the course of which the numerator of the relation is calculated for a given string.

In the course of this sub-step 82 the model probability $P_m = P(O_t|\tilde{Q}_t)$ is combined with the a priori model probability of the model in progress $P(H_n)$, the average duration of occupancy of the aligned sequence $\bar{d}(\tilde{Q}_t)$ and the average duration of the model in progress $\bar{d}(H_n)$.

The step 80 then includes a sub-step 84 of calculation of the product of the probability of models $P_m$ with the a priori model probability $P(\lambda_i)$ and the a priori value probability $P_{vp}$. This sub-step 84 is carried out for all the non-observable states of all the possible models of the finite directory of models.

Subsequently the method includes a step 86 of summation of all the products previously determined for all the possible models $\lambda_1$ to $\lambda_I$ of the finite directory of models.

In this way a confidence index is determined for a given acoustic string.

The method then includes a step 88 of combination of the confidence indices of each string of the given acoustic segment in order to supply the confidence index $I_n$ of the model $H_n$ under consideration.

The relation defining $I_n$ can be reduced to the following algorithmic equation:

$$I_n = \sum_{t=b(n)}^{e(n)} \left[ \log P(O_t|\tilde{Q}_t) + \log \bar{d}(\tilde{Q}_t) - \log \bar{d}(H_n) + \log P(H_n) - \log \left[ \sum_{i=1}^{I} \sum_{j=1}^{J(i)} P\left(O_t|Q_t = q_j^i\right) \frac{\bar{d}(q_j^i)}{\bar{d}(\lambda_i)} P(\lambda_i) \right] \right]$$

Therefore the sub-steps 82, 84 and 86 of step 80 may be described in an algorithmic manner in the following form:

An accumulator PO is defined, then the following calculations are carried out: PO=0;

For each model $\lambda_i$ of the directory, with i being between 1 and I, and for each state j of the model $\lambda_i$ with j being between 1 and J(i), the following calculations are made:

$$PO = PO + P(O_t|q_j^i) \frac{\bar{d}(q_j^i)}{\bar{d}(\lambda_i)} P(\lambda_i);$$

$$I_n = I_n + \log P(O_t|\tilde{Q}_t);$$

$$I_n = I_n + \log \bar{d}(q_t^n);$$

$$I_n = I_n - \log \bar{d}(H_n);$$

$$I_n = I_n + \log P(H_n);$$

-continued $$I_n = I_n - PO.$$

In the preceding relations the previous index value $I_n$ is successively updated to the current value.

The method then advantageously includes a sub-step 90 of standardisation of the alignment confidence index in order to deliver a confidence index which is standardised relative to the total duration of the model.

Thus from the probability of models $P_m$ of the a priori model probability $P(\lambda_i)$ and the average duration of occupancy of the non-observable states $\bar{d}(q_j^i)$ the step 80 delivers the alignment confidence index $I_n$.

This confidence index is very reliable due to the fact in particular that it is calculated from a priori value probabilities $P_{vp}$ estimated in an analytical manner from the average duration of occupancy of the non-observable states of the process, thus making it possible to take into account the time passed in each of the hidden states and then to take into account the temporal characteristics of the sequence of models $H_1^N$.

Subsequently the method includes a step 100 of local modification of the sequence $H_1^N$ as a function of the alignment confidence indices $I_n$ determined for each model of the sequence.

Thus during the step 100 a decision permitting a model to be either accepted or rejected is taken for each model of the sequence $H_1^N$.

In the described embodiment, this decision is taken automatically as a function of the confidence index $I_n$ determined during the step 80 and a functioning point considered as a threshold for acceptance or rejection of the model.

When a model is rejected, the step 100 of local modification then alternatively includes a sub-step of deletion, substitution or insertion of a model.

Thus one or more models of the sequence of models $H_1^N$ may be manually or automatically deleted, replaced or one or more new models may be interposed between two models of the sequence.

Advantageously the sequence thus modified is then used again in the method in order to be re-aligned with the sequence of acoustic strings $O_1^T$ during the step 60 and to give rise to a new calculation of a confidence index for each association between a model and an acoustic segment during the step 80.

The steps 60, 80 and 100 are repeated until there is no longer any rejected model or until there are no longer any possible modifications such that the delivered sequence of labelled strings corresponds to the best possible hypothesis of decoding.

It is therefore apparent that the method according to the invention permits the definition of a confidence index with increased precision. The use of this index makes it possible in particular to automate the whole of the method of processing of a speech signal, to define automatic modifications and to obtain an optimised result.

The described method may be implemented by software and/or hardware means such as computers, microprocessors or any other adapted equipment.

The described method may for example be used in systems for voice synthesis or for forming learning databases for voice recognition systems and, due to the use of a very precise confidence index and the relooping after an automatic modification, makes it possible to obtain sequences of labelled strings which are reliable and can be exploited directly without requiring human intervention.

Within the framework of voice synthesis, as has been described, the sequence of models and the sequence of acoustic strings correspond to the same text.

As a variant, the method according to the invention can be used in voice recognition systems for example in order to form databases of recognition samples or to permit recognition of a statement in a directory of sequences of models.

For example, the predetermined likely model sequences are aligned successively with the sequence of acoustic strings known as the target sequence and the confidence indices of each model are combined over the whole of the sequence in order to deliver a measurement of similarity between the sequence of models and the sequence of acoustic strings. The association with the highest measurement of similarity is retained.

Alternatively, the selected sequence is obtained by modification at each relooping in a similar manner to the previously described embodiment.

Finally, in the example described the hidden Markov models are models of which the non-observable processes have discrete states. However, the method may also be carried out with models of which the non-observable processes have continuous values.

The invention claimed is:

1. Method of automatic processing of a speech signal comprising:
   an automatic step of determination of at least one sequence of probability models coming from a finite directory of models, each sequence describing the probability of acoustic production of a sequence of symbolic units of a phonological nature coming from a finite alphabet, the said sequence of symbolic units corresponding to at least one given text and the said probability models each including an observable random process corresponding to the acoustic production of symbolic units and a non-observable random process having known probability properties, so-called Markov properties;
   a step of processing a speech signal to determine a sequence of digital data strings, known as acoustic strings, representing acoustic properties of the speech signal;
   a step of alignment between the said sequence of acoustic strings and the said at least one sequence of models, each model being associated with a sub-sequence of acoustic strings, forming an acoustic segment, and each value of the non-observable process of each model being associated with a sub-sequence of acoustic strings forming an acoustic sub-segment in order to deliver a sequence of non-observable process values associating a value with each acoustic string, known as an aligned sequence;
   a step of determination of a confidence index of acoustic alignment for each association between a model of the sequence and an acoustic segment, known as a model alignment confidence index, and corresponding to an estimate of the probability a posteriori of the model given the observation of the corresponding acoustic segment, known as the a posteriori model probability, said step of determination of a confidence index of acoustic alignment providing data of the confidence index of acoustic alignment,
   characterised in that each step of determination of an alignment confidence index for a model comprises the calculation of the value of the said index at least from a combination of:
   the probability of observation of each acoustic string given the value of the non-observable process, known as the model probability and determined from known characteristic parameters of the probability model;

probabilities of production a priori of all the models of the said directory, independently of one another, known as the a priori model probabilities; and the analytical estimation of the average duration of occupancy of the values of the non-observable process of the model; and a step of delivering a final sequence of labeled strings comprised of speech data.

2. Method as claimed in claim 1, characterised in that each step of determination of an acoustic confidence index for a model includes a sub-step of determination of the estimate of the a priori probability of each value of the non-observable process of the model, known as the a priori value probability, carried out on the basis of the said analytical estimation of the average duration of occupancy of the values of the non-observable process of the model.

3. Method as claimed in claim 1, characterised in that each step of determination of an alignment confidence index for a model includes a sub-step of determination of a confidence index for each acoustic string forming the acoustic segment associated with the said model and a sub-step of combination of the confidence indices of each string of the said segment in order to deliver the said confidence index of the said model.

4. Method as claimed in claim 3, characterised in that each sub-step of determination of a confidence index for a given string includes:

a sub-step of initial calculation combining the model probability, the a priori model probability of the model in progress and the average duration of occupancy of the non-observable values for all the values of the non-observable process of the said aligned sequence and of the model in progress;

a sub-step of calculation of the product of the model probability, the a priori model probability and the a priori value probability, produced for each value of the non-observable process of all the possible models in the said finite directory of models; and a sub-step of summation of all the said products for all the possible models of the said finite directory of models in order to deliver the said confidence index of the said given acoustic string from the results of the said sub-steps.

5. Method as claimed in claim 1, characterised in that it includes a sub-step of standardisation of the confidence indices by model as a function of the duration of the models.

6. Method as claimed in claim 1, characterised in that the said automatic step of determination of a sequence of probability models corresponding to a given text includes:

a sub-step of acquisition of a graphemic representation of the said given text;

a sub-step of determination of the said sequence of symbolic units from the said graphemic representation; and an automatic sub-step of modeling of the said sequence of symbolic units by its breakdown on a base of the said probability models in order to deliver the said sequence of probability models.

7. Method as claimed in claim 6, characterised in that the said modeling sub-step associates a single probability model with each symbolic unit of the said sequence of symbolic units.

8. Method as claimed in claim 1, characterised in that the said step of determination of a sequence of digital strings includes:

a sub-step of acquisition of a speech signal corresponding to the diction of the said given text, adapted in order to deliver a sequence of digital samples of the said speech signal; and a sub-step of spectral analysis of the said samples in order to deliver a breakdown of the frequency spectrum of the said speech signal on a non-linear scale, the said breakdown forming the said sequence of acoustic strings.

9. Method as claimed in claim 8, characterised in that the said sub-step of spectral analysis corresponds to a sub-step of Fourier transformation of the said speech signal, of determination of the distribution of its energy on a non-linear scale by filtering, and of transformation into cosine.

10. Method as claimed in claim 1, characterised in that the said step of alignment between the said sequence of acoustic strings and the said sequence of models includes:

a sub-step of calculation of a plurality of possible alignments each associated with a relevance index; and a sub-step of selection of a single alignment amongst the said plurality of possible alignments.

11. Method as claimed in claim 10, characterised in that the said sub-step of determination of a plurality of possible alignments comprises the calculation of at least one optimum alignment, as determined by a so-called Viterbi algorithm.

12. Method as claimed in claim 1, characterised in that it also includes a step of local modification of the said sequence of models as a function of the said alignment confidence indices determined for each model of the said sequence of models.

13. Method as claimed in claim 12, characterised in that the said step of local modification comprises a sub-step of deletion of a model from the said sequence of models.

14. Method as claimed in claim 12, characterised in that the said step of local modification includes a sub-step of substitution of a model of the said sequence of models by another model.

15. Method as claimed in claim 12, characterised in that the said step of local modification includes a sub-step of insertion of a model between two models of the said sequence of models.

16. Method as claimed in claim 12, characterised in that the said steps of alignment and of calculation of a confidence index are repeated after each step of local modification of the said sequence of models.

17. Method as claimed in claim 1, characterised in that the said step of determination of at least one sequence of models is adapted for the determination of a sequence of models corresponding to a given text, and in that the said sequence of acoustic strings represents properties of a speech signal corresponding to the locution of the said same given text.

18. Method as claimed in claim 1, characterised in that the said step of determination of sequences of models is adapted for the determination of a plurality of sequences of models each corresponding to a given text, and in that the said sequence of acoustic strings represents properties of a speech signal corresponding to the locution of any text whatsoever, the said method including a step of selection of one or several sequences of models amongst the said plurality for carrying out the said step of determination of confidence indices.

19. Method as claimed in claim 1, characterised in that the said models are models of which the observable processes have discrete values, the values of the non-observable processes being the states of these processes.

20. Method as claimed in claim 1, characterised in that the said models are models of which the nonobservable processes have continuous values.

21. Method as claimed in claim 1, wherein,
said automatic step of determination of at least one sequence of probability models comprises:
i) acquisition of a symbolic representation of the at least one given text in one of a graphemic representation and an orthographic representation,
ii) with reference to a database, determination of a sequence of symbolic units of the phonological nature of the finite alphabet from the said symbolic representation, and
iii) modeling the determined sequence of phonetic symbolic units by a breakdown on a base of probability models of hidden Markov models,
said step of processing a speech signal to determine a sequence of digital data strings, includes acquiring said speech signal and said acquired speech signal corresponding to said at least one given text, and an analysis carried out on a Hamming sliding window,
said step of alignment between the said sequence of acoustic strings and the said at least one sequence of models applies a Viterbi algorithm, and
further comprising the step of processing a speech signal by applying the confidence index as part of a system for one of voice synthesis and voice recognition.

* * * * *